United States Patent
Wang et al.

(10) Patent No.: US 10,263,904 B2
(45) Date of Patent: Apr. 16, 2019

(54) KIND OF SELF-ADAPTIVE NETWORK CONGESTION CONTROL METHOD BASED ON SCPS-TP

(71) Applicant: SICHUAN UNIVERSITY, Chengdu, Sichuan (CN)

(72) Inventors: Junfeng Wang, Chengdu (CN); Lixiang Liu, Chengdu (CN); Fuchun Sun, Chengdu (CN); Dong Liu, Chengdu (CN); Shiping Yang, Chengdu (CN)

(73) Assignee: SICHUAN UNIVERSITY, Chengdu (CN)

( * ) Notice: Subject to any disclaimer, the term of this patent is extended or adjusted under 35 U.S.C. 154(b) by 0 days.

(21) Appl. No.: 15/602,433

(22) Filed: May 23, 2017

(65) Prior Publication Data
US 2017/0346750 A1    Nov. 30, 2017

(30) Foreign Application Priority Data
May 25, 2016  (CN) .......................... 2016 1 0353439

(51) Int. Cl.
*H04L 1/00*       (2006.01)
*H04L 1/16*       (2006.01)
(Continued)

(52) U.S. Cl.
CPC ............ *H04L 47/27* (2013.01); *H04L 1/0019* (2013.01); *H04L 1/1607* (2013.01);
(Continued)

(58) Field of Classification Search
CPC ..... H04L 47/27; H04L 1/0019; H04L 1/1825; H04L 43/08; H04L 47/12; H04L 1/1607
See application file for complete search history.

(56) References Cited

U.S. PATENT DOCUMENTS 7,983,156 B1 *   7/2011   Papirakis ................ H04L 47/25
                                                    370/229
8,509,080 B2 *   8/2013   Lee ..................... H04B 7/18586
                                                    370/235

(Continued)

OTHER PUBLICATIONS

Ruhai Wang, 2008, iEEE, vol. 44, no. 1, 157-170.*

*Primary Examiner* — Ivan O Latorre
(74) *Attorney, Agent, or Firm* — Oliff PLC

(57) ABSTRACT

A kind of self-adaptive network congestion control method based on SCPS-TP, which includes the following steps: The SCPS-TP's gateway source-end receives and transmits the packets to destination end; Judge if there is new packet received in accordance with the analyzed ACK; If there is no new packet received, when the duplicate ACK counter increase to a certain value, change the window size's growth pattern to linear self-adaptive pattern; If there is new packet received, the congestion control is in the exponential growth pattern. After window is enlarged, Diff is bigger than the set threshold value and the congestion control method is changed to linear self-adaptive pattern; If congestion control is in the linear self-adaptive pattern, adjust window size in accordance with Diff; The SCPS-TP's gateway source-end sends the packets in the packet loss buffer to destination end and sends new packets in accordance with the size of congestion window.

5 Claims, 4 Drawing Sheets

(51) Int. Cl.
*H04L 1/18* (2006.01)
*H04L 12/26* (2006.01)
*H04L 12/801* (2013.01)
*H04L 12/807* (2013.01)

(52) U.S. Cl.
CPC ............ *H04L 1/1825* (2013.01); *H04L 43/08* (2013.01); *H04L 47/12* (2013.01)

(56) References Cited

U.S. PATENT DOCUMENTS

| | | | |
|---|---|---|---|
| 9,825,733 B1* | 11/2017 | Ho | H04L 1/0076 |
| 2006/0067222 A1* | 3/2006 | Endoh | H04L 69/16 |
| | | | 370/231 |
| 2007/0165524 A1* | 7/2007 | Mascolo | H04L 47/11 |
| | | | 370/230 |
| 2007/0223492 A1* | 9/2007 | Lee | H04W 28/18 |
| | | | 370/395.52 |
| 2008/0025216 A1* | 1/2008 | Singh | H04L 47/10 |
| | | | 370/231 |
| 2008/0304437 A1* | 12/2008 | Duvvury | H04B 7/18584 |
| | | | 370/320 |
| 2010/0020689 A1* | 1/2010 | Tang | H04L 47/10 |
| | | | 370/235 |
| 2012/0163385 A1* | 6/2012 | Lee | H04L 47/17 |
| | | | 370/392 |
| 2012/0278804 A1* | 11/2012 | Narayanasamy | G06F 9/45558 |
| | | | 718/1 |
| 2013/0044598 A1* | 2/2013 | Zhang | H04L 43/0882 |
| | | | 370/232 |
| 2014/0056136 A1* | 2/2014 | Jain | H04L 47/12 |
| | | | 370/230 |
| 2014/0334296 A1* | 11/2014 | Waclawsky | H04L 47/12 |
| | | | 370/230 |
| 2015/0188830 A1* | 7/2015 | Zhao | H04L 47/27 |
| | | | 370/235 |
| 2016/0094465 A1* | 3/2016 | Park | H04L 43/0864 |
| | | | 370/235 |
| 2018/0139629 A1* | 5/2018 | Chakrabarti | H04W 24/02 |

* cited by examiner

KIND OF SELF-ADAPTIVE NETWORK CONGESTION CONTROL METHOD BASED ON SCPS-TP

TECHNOLOGY FIELD

This invention involves the reliable transmission method of the network, which involves a kind of self-adaptive network congestion control method based on SCPS-TP in detail.

BACKGROUND TECHNOLOGY

At present, as the satellite communication has the advantages of wide coverage area, quick and flexible networking, being free from geographic limitations, etc., it forms the complementary and competitive situations with the ground communication in recent years; It is widely applied in the economic and military fields of application communication and national defensive system of the satellite phone, navigational positioning and the emergencies such as emergency rescue and disaster relief, etc.

The satellite communication utilizes the man-made earth satellite as the relay station to transmit the radio wave, realizing the communication between two or more earth stations; As the transmission distance to the radio signal of satellite communication is very far, it results in the large delay on transmission; For example, the communication distance of the geosynchronous earth orbit satellite which is often used for the navigational positioning and data relay is about 36000 km, whose transmission delay can reach 500 ms~800 ms; The far transmission distance will caused the great attenuation of signal at the same time and the signal to noise ratio of the received signal is extremely low. And the unstable space environment will result in the bit error rate of the link remaining high; in actual application, the bit error rate of space communications can reach $10^{-3}$ but the hit error rate of ground-to-ground transmission is only $10^{-10}$; The high delay and the high bit error rate of the link give a challenge to the traditional communication method.

Currently, a series of solutions are proposed in accordance with the influences of the adverse factors such as high transmission delay, high bit error rate and link asymmetry, etc. of the space communications on the transmission protocol; For example, the bandwidth measurement mechanism is added to the TCP Westwood on the basis of the traditional TCP for the adjustment strategy of the congestion window, eliminating influence of the high hit error rate. However, as the traditional strategy of TCP is still used for its slow start and the congestion avoidance stage, influence of delay on the protocol is relatively big, which cannot utilize the bandwidth very well; XCP monitors the network traffic situation with the middle router, which reflects the network situation to the sending end through modifying the head field of the packet but the protocol needs the special router to support the protocol; TCP-Peach tests the congestion situation of the network through sending dummies and uses the sudden start and rapid recovery mechanism, which can quickly recover and occupy the bandwidth after the connection establishment and the packet loss. It is applicable for the network with high delay and high bit error rate but the protocol requires the intermediate router to support the priority strategy, otherwise the dummies \\Till result in pressure on the link; the delay tolerant network (DTN) architecture uses the strategy of copying/flooding in the whole network. Although in this way it can improve the transmission probability and reduce the transmission delay, but too many redundant copies will result in great waste for the network resource. Also, DTN needs the intermediate node to store all packets received in the buffer before the successful transmission of the received packets, which will largely consume the satellite network resource; The Space Communications Protocol Specification-Transport Protocol (SCPS-TP) is the transmission protocol proposed by the Consultative Committee for Space Data Systems (CCSDS) facing the space communication environment, which is developed based on the transmission protocol of traditional ground communication. The protocol adopts larger window size and adds Selective Negative Acknowledgment (SNACK) mechanism, header compression function and rate control function, which can adapt the satellite network with large bandwidth delay product and high bit error rate and is the network transmission protocol that is used the most widely at present. However, it still has the phenomenon that the intermediate router queue is too long and causes severe packet loss due to network congestion. Also, it cannot fully utilize the bandwidth in accordance with the actual network situation.

Invention Content

This invention a self-adaptive network congestion control method which can change the network window size in accordance with the actual network operation situation.

The technical program adopted by this invention is: a kind of self-adaptive network congestion control method based on SCPS-TP, which includes the steps as follows:

A. The source-end gateway of SCPS-TP receives the ACKs and packets from the ground end, repackages the packets and sends them to the destination end gateway; After the destination end gateway of SCPS-TP receives the ACKs and packets from the source-end gateway, it analyzes, stores and transmits the packets to the ground destination end;

B. When the information in the ACKs and packets analyzed in Step A has SNACK option, record the information in the linked list of packet toss buffer;

C. Judge if there is new packet received in accordance with the ACK and packet analyzed in Step A; If there is new confirmed packet received, update the corresponding information; If not, the duplicate ACK counter count. When the duplicate ACK counter increases to a certain value, reduce the size of the window and change the growth mode to the linear self-adaptive mode;

D. If there is new packet received in Step C, measure the estimated value sample of the bandwidth, conduct smoothing on the sample and calculate the difference Diff between the expected throughput and the actual throughput;

E. If the growth pattern is the exponential growth pattern and the Diff in Step D is bigger than the set valve after the window is enlarged, the growth pattern is changed to the linear self-adaptive pattern; If the growth pattern is the linear self-adaptive pattern, adjust the window size in accordance with the Diff in Step D;

F. The gateway source end of SCPS-TP sends out the packets in the packet loss buffer in Step B and sends out the new packets in accordance with the size of the congestion window.

Furthermore, control method of the window under the mentioned linear self-adaptive pattern is as follows:

$$W_t = \begin{cases} \max(W_{t-1} + MAXSEG, \overline{BW_t} \times SRTT) & Diff_t \leq Alpha_{t-1} \\ W_{t-1} & Alpha_{t-1} < Diff_t < Beta_{t-1} \\ W_{t-1} - MAXSEG & Diff_t \geq Beta_{t-1} \end{cases}$$

Therein, $W_t$ is the size of window at moment t, MAXSEG is the maximum segment length, SRTT is the RTT value after smoothing, $Alpha_t$ is the Alpha value of Moment t, $Beta_t$ is the Beta value of Moment t and $\widehat{Bw_t}$ is the bandwidth evaluation value of Moment t after smoothing;

Conduct self-adaptive adjustment on the damping threshold value $Alpha_t$ and $Beta_t$ in accordance with the current throughput and the throughput of the last moment and adopt the average method to move the threshold range around Diff, whose specific method is as follows:

$$X_t = \frac{|Alpha_{t-1} - Diff_t|}{2}$$

$$Y_t = \frac{|Beta_{t-1} - Diff_t|}{2}$$

$$(Alpha_t, Beta_t) = \begin{cases} (Alpha_{t-1} - X_t, Beta_{t-1} - X_t) & Actual_t < Actual_{t-1} \text{ AND } Diff_t < Alpha_{t-1} \\ (Alpha_{t-1} - Y_t, Beta_{t-1} - Y_t) & Actual_t < Actual_{t-1} \text{ AND } Diff_t > Beta_{t-1} \\ (Alpha_{t-1} + X_t, Beta_{t-1} + X_t) & Actual_t > Actual_{t-1} \text{ AND } Diff_t < Alpha_{t-1} \\ (Alpha_{t-1} + Y_t, Beta_{t-1} + Y_t) & Actual_t > Actual_{t-1} \text{ AND } Diff_t > Beta_{t-1} \\ (Alpha_{t-1}, Beta_{t-1}) & OTHERS \end{cases}$$

Therein, $X_t$ and $Y_t$ are the adjustment factors of the damping threshold value of Moment t.

Further, the calculation method of the Diff at Moment t in the mentioned Step D is as follows:

$$Diff_t = Expected_t - Actual_t = \frac{Window\ Size_t}{BaseRTT_t} - \frac{Byte_t}{Sample\ RTT_t}$$

Therein: $Expected_t$ is the throughput which is expected by Moment t, $Actual_t$ is the throughput which is measured actually by Moment t, $BaseRTT_t$ is the minimum round trip time which is recorded by Moment t, $Window\ Size_t$ is the number of bytes in the network of Moment t, $Byte_t$ is the data seated from sending to receiving a feedback of every packet recorded by the sender at Moment t and $Sample\ RTT_t$ is the actual RTT of this packet at Moment t.

Further, the smoothing method in the mentioned Step D is as follows:

Adopt the exponential weighting average filter (EWMA) with vertical horizontal filter (VHF) to conduct smoothing and calculate the weighting factor of EWMA in accordance with the dispersion degree of the measured bandwidth evaluation value sample and conduct smoothing as per the formula as follows:

$$a_t = b \times \frac{\Delta max_t}{\sum_{k=t-M}^{t} |OBW_k - OBW_{k-1}|}$$

$$\overline{BW_t} = (1 - a_t) \times OBW_t + a_t \overline{BW_{t-1}}$$

Therein: $a_t$ is the EWMA weighting factor of Moment t, b is the constant factor of VHF and $\Delta max_t$ is difference between the maximum and the minimum of the newest M measured bandwidth evaluation value samples of Moment t. M is the size of VHF sample window, $OBW_t$ is the bandwidth evaluation value sample measured at Moment t and $\overline{BW_t}$ is bandwidth evaluation value of Moment t after passing by the EWMA with VHF.

Further, the SCPS-TP gateway source end in Step A uses TCP spoofing technology to pretend as the ground end after repackaging the packet and sends the packet to the target end.

The beneficial effects of this invention are:

(1) The linear self-adaptive pattern is adopted as the window growth pattern of this invention, which can dynamically control the buffering queue length of the intermediate router; And for different bandwidth delay product and the constantly changing network situations, its self-adaptive character makes no manual intervention is needed during the transmission for configuring corresponding parameters, offering network transmission acceleration function;

(2) This invention adopts the bandwidth evaluation algorithm using EWMA smoothing with VHF and takes part in the calculation by adopting the self-adaptive bandwidth weighting factor, in which the influence of the network environment change on the algorithm is smaller and the bandwidth measured is more stable and accurate;

(3) This invention can let the ground end get the feedback information in time through TCP spoofing technology, making the transmission faster.

SPECIFIC EXECUTION METHOD

Further specific specification is given as follows by combining the attached diagrams and the implementation case in detail.

Figure 4:
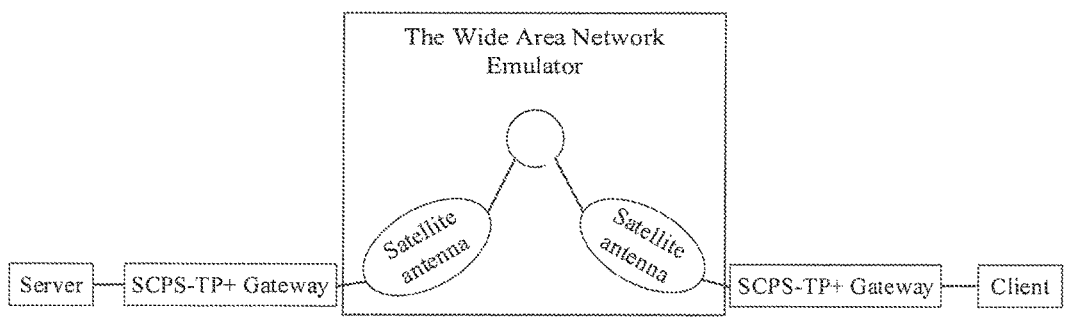
FIG. 4 shows the deployment topology diagram of the testing environment for this invention.

This invention is conducted against the space communications mainly, which is based on the SCPS-TP and defines the specific process of adding the technical feature in the Claims on the basis of SCPS-TP as SCPS-TP+; The SCPS-TP+ gateway in FIG. 4 is the gateway adopting SCPS-TP+ processing process.

Figure 1:
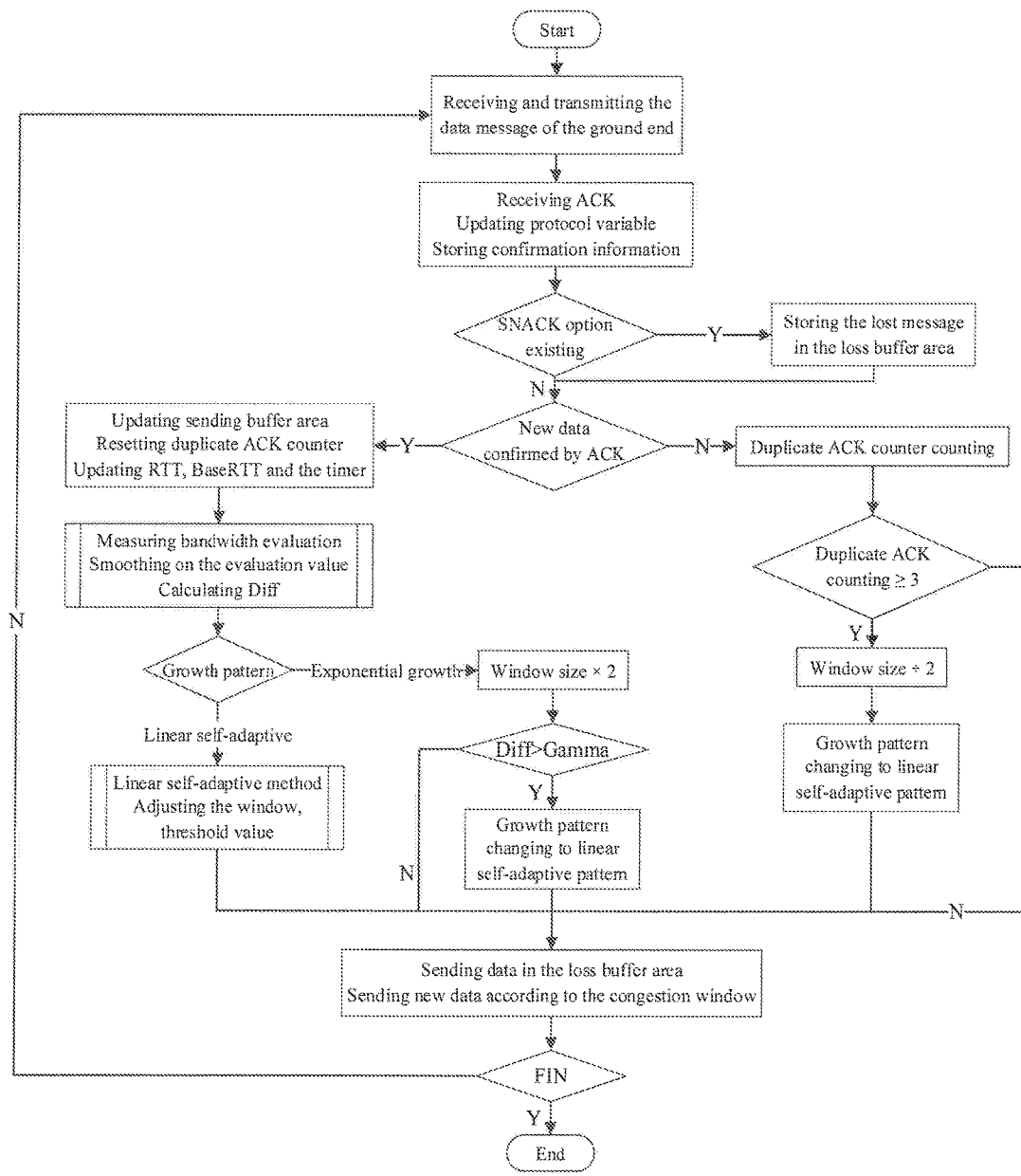
FIG. 1 shows the control method flow diagram of this invention.
Figure 2:
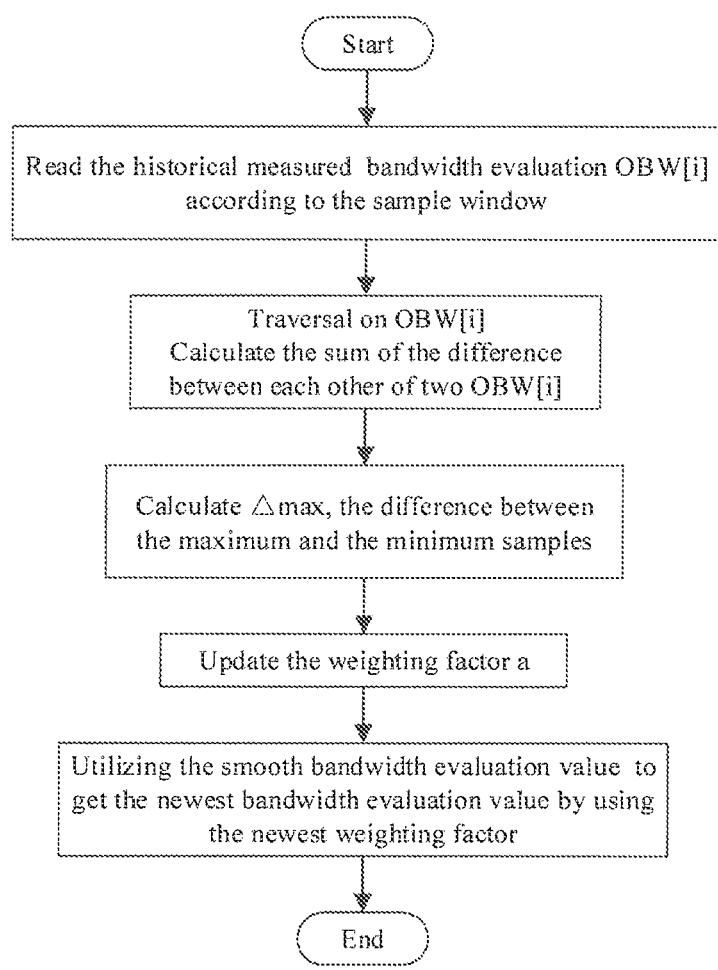
FIG. 2 shows the calculation method flow diagram of EWMA smoothing with VHF.
Figure 3:
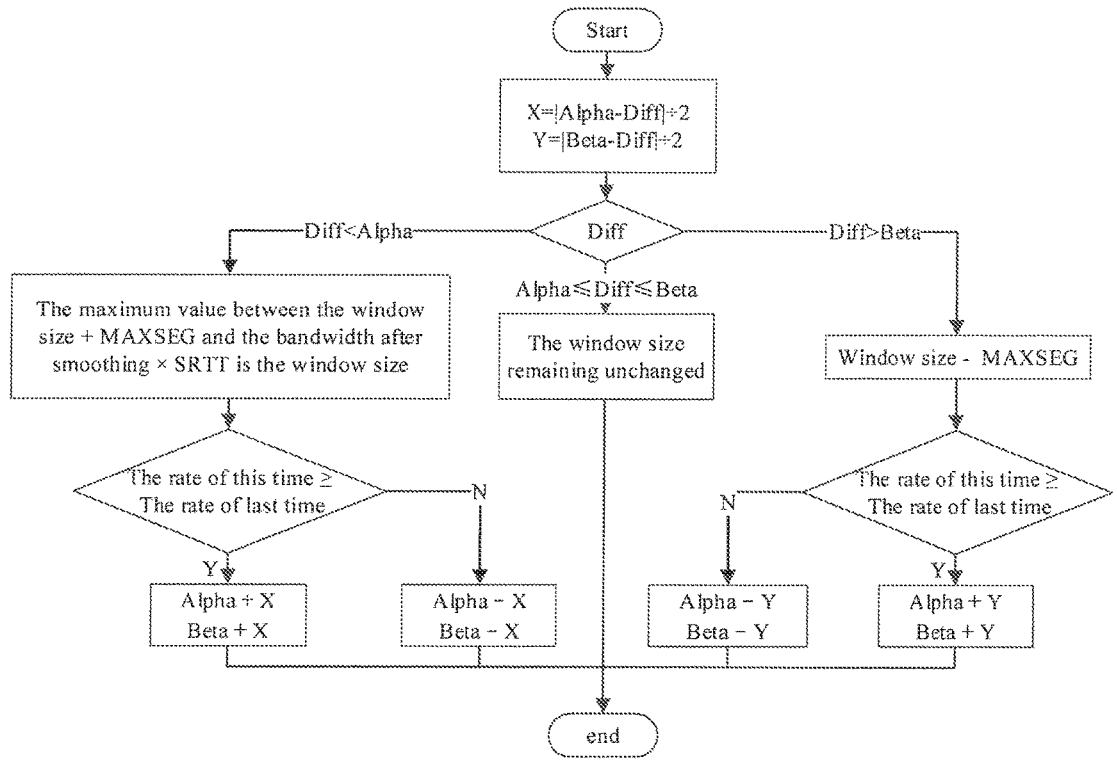
FIG. 3 shows the flow diagram of linear self-adaptive method of this invention.

The self-adaptive network congestion control method based on SCPS-TP as shown in FIG. 1 includes the steps as follows:

A. The source-end gateway receives the ACKs and packet from the ground end, repackages the packet and send them to the destination end gateway; After the destination end gateway of SCPS-TP receives the ACKs and packet of the source-end gateway, it analyzes, stores and transmits the packet to the ground destination end; The analyzed ACK and the packet include the acknowledgement number, timestamp and SCPS expansion information, and converted them into SCPS-TPpackets.

B. When the information in the ACK and packet analyzed in Step A has SNACK option, record the information in the linked list of packet loss buffer; the existence of SNACK option means that there is packet loss during the transmission. Insert the lost packets marked by the SNACK option which are stored in the sending buffer into the linked list that records the lost packets in order and check if there is overlap in the packet loss linked list; SNACK option refers to the information judged by the Selective Negative Acknowledgement mechanism.

C. Judge if there is new packet received in accordance with the ACK and packet analyzed in Step A; If there is new packet received, update the initial sequence number of sending buffer, reset the Duplicate ACK counter, update the RTT and the RTT when the network is not congested, i.e. the minimum value BaseRTT in all actual measurements and the timer; If not, the Duplicate ACK counter counts. When the Duplicate ACK counter increases to a certain value, reduce the size of the window and change the growth mode to the linear self-adaptive mode, preparing for the packet retransmission after that; Judge if there is new packet received in accordance with the acknowledgement signal analyzed in Step A; When the Duplicate ACK counter of this case ≥3, it means that the network is relatively congested and the self-adaptive adjustment shall be conducted on the window in accordance with the network situation, whose size shall be reduced to half of its original size;

D. If there is new packet received in Step C, measure the bandwidth estimation value, conduct smoothing on the sample and calculate the difference Diff between the expected throughput and the actual throughput in accordance with the ACK information;

E. If the growth pattern is the exponential growth pattern, the window can quickly grow. The window is enlarged to be twice as big as the original size in this case; If the Diff in Step D is bigger than the set valve, the network is thought to be congested, whose increasing speed needs to be slowed down and the congestion control method is changed to linear self-adaptive pattern; If the congestion control is the linear self-adaptive pattern, adjust the window size in accordance with the Diff in Step D; If the Diff is relatively small, it certifies that the actual throughput is close to the expected throughput and the network is not congested. And the window can be increased in accordance with the bandwidth evaluation value after smoothing, otherwise the window needs to be reduced; Adjustment on the size of the window is conducted in accordance with the bandwidth evaluation value after smoothing;

The congestion control is with exponential growth pattern initially and enters into the linear self-adaptive pattern after congestion occurs. If the windows reduce to 1 in the linear self-adaptive pattern, reenter into the exponential growth pattern; Linear self-adaptive pattern: Self-adaptive mechanism is added on the basis of linear growth or reducing of the original window, which can conduct self-adaptive judgment on the network congestion situation and conduct the bandwidth evaluation in accordance with the network congestion situation and the size of evaluated bandwidth adjustment windows at the same time.

F. The gateway source end of SCPS-TP sends out the packets of the packet loss buffer in Step B and sends out the new packets in accordance with the size of the congestion window.

Figure 5:
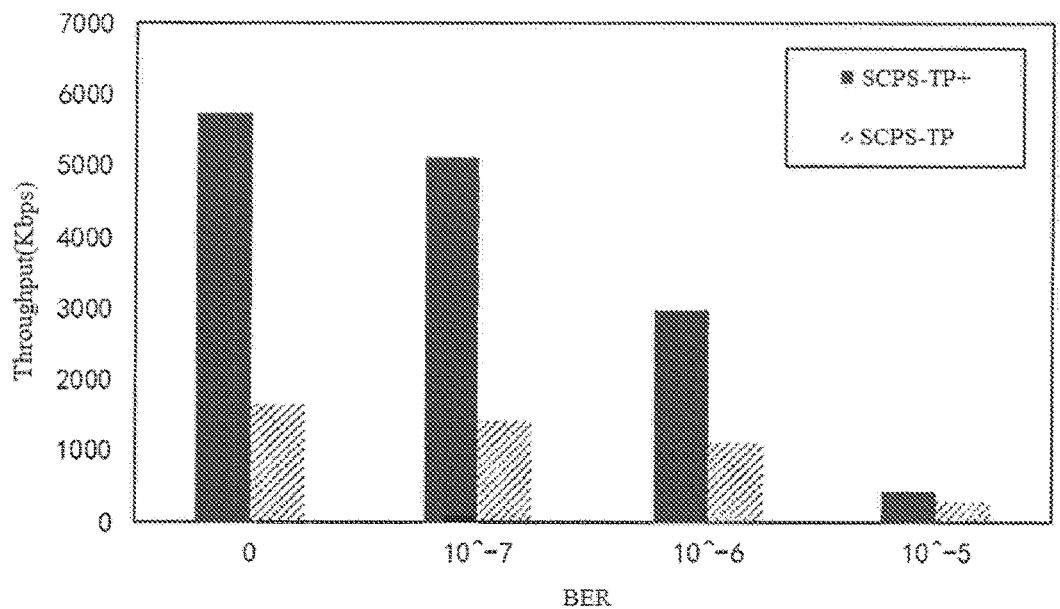
FIG. 5 shows the network transmission performance comparison diagram of adopting the control method of this invention and that of other protocols when the bottleneck bandwidth is 100 Mbps and the round trip time is 400 ms.

As shown in FIG. 5, under the mentioned linear self-adaptive pattern, the control method of the window is as follows:

$$W_t = \begin{cases} \max(W_{t-1} + MAXSEG, \widetilde{BW_t} \times SRTT) & Diff_t \le Alpha_{t-1} \\ W_{t-1} & Alpha_{t-1} < Diff_t < Beta_{t-1} \\ W_{t-1} - MAXSEG & Diff_t \ge Beta_{t-1} \end{cases}$$

Therein, $W_t$ is the size of window at moment t, MAXSEG is the maximum segment length, SRTT is the RTT value after smoothing, $Alpha_t$ is the Alpha value of Moment t, $Beta_t$ is the Beta value of Moment t and $\widetilde{BW_t}$ is the bandwidth evaluation value of Moment after smoothing;

Conduct self-adaptive adjustment on the damping threshold value $Alpha_t$ and $Beta_t$ in accordance with the current throughput and the throughput of the last moment and adopt the average method to move the threshold range around Diff, whose specific method is as follows:

$$X_t = \frac{|Alpha_{t-1} - Diff_t|}{2}$$

$$Y_t = \frac{|Beta_{t-1} - Diff_t|}{2}$$

$$(Alpha_t, Beta_t) = \begin{cases} (Alpha_{t-1} - X_t, Beta_{t-1} - X_t) & Actual_t < Actual_{t-1} \text{ AND } Diff_t < Alpha_{t-1} \\ (Alpha_{t-1} - Y_t, Beta_{t-1} - Y_t) & Actual_t < Actual_{t-1} \text{ AND } Diff_t > Beta_{t-1} \\ (Alpha_{t-1} + X_t, Beta_{t-1} + X_t) & Actual_t > Actual_{t-1} \text{ AND } Diff_t < Alpha_{t-1} \\ (Alpha_{t-1} + Y_t, Beta_{t-1} + Y_t) & Actual_t > Actual_{t-1} \text{ AND } Diff_t > Beta_{t-1} \\ (Alpha_{t-1}, Beta_{t-1}) & \text{OTHERS} \end{cases}$$

Therein, $X_t$ and $Y_t$ are the adjustment factors of the damping threshold value of Moment t.

Further, the calculation method of Diff at Moment t in the mentioned Step D is as follows:

$$Diff_t = Expected_t - Actual_t = \frac{Window\ Size_t}{BaseRTT_t} - \frac{Byte_t}{Sample\ RTT_t}$$

Therein: $Expected_t$ is the throughput which is expected by Moment t, $Actual_t$ is the throughput which is measured actually by Moment t, $BaseRTT_t$ is the minimum RTT which is recorded by Moment t, Window $Size_t$ is the number of bytes in the network of Moment t, $Byte_t$ is the data rented from sending to receiving a feedback of every packet recorded by the sender at Moment t and Sample $RTT_t$ is the actual RTT of this packet at Moment t; Through self-adaptive adjustment on the value of damping threshold value Alpha and Beta, control the buffering queue length of intermediate router dynamically; Being compared with the method by adopting fixed threshold value Alpha and Beta, this method can automatically adapt different network traffic situations, which can avoid of the severe packet loss of network congestion due to the queue of intermediate router which is too long and also can utilize the bandwidth.

As shown in FIG. 4, the smoothing method of the mentioned Step D is as follows:

Adopt the exponential weighting average filter (EWMA) with vertical horizontal filter (VHF) to conduct smoothing and calculate the weighting factor of EWMA in accordance with the dispersion degree of the measured bandwidth evaluation value sample and conduct smoothing as per the formula as follows:

$$a_t = b \times \frac{\Delta \max_t}{\sum_{k=t-M}^{t} |OBW_k - OBW_{k-1}|}$$

$$\overline{BW_t} = (1 - a_t) \times OBW_t + a_t \overline{BW_{t-1}}$$

Therein: $a_t$ is the EWMA weighting factor of Moment t, b is the constant factor of VHF and $\Delta \max_t$ is difference between the maximum and the minimum of the newest M measured bandwidth evaluation value samples of Moment t, M is the size of VHF sample window, $OBW_t$ is the bandwidth evaluation value sample measured at Moment t and $\overline{BW_t}$ is bandwidth evaluation value of Moment t after smoothing of the EWMA with VHF; Being compared with the bandwidth evaluation algorithm of traditional TCP Westwood, this method takes part in the calculation by adopting the self-adaptive bandwidth weighting factor, in which the influence of the network environment change on the algorithm is smaller and the bandwidth measured is more stable and accurate. And at the same time, it can reflect the size of the actual bandwidth more appropriately.

Further, the SCPS-TP gateway source end in mentioned Step A uses TCP spoofing technology to pretend as the ground end after repackaging the packet and sends the packet to the destination end. Due to complexity of the space network environment, it takes the longer time to send the packets to the destination end through the satellite and it is easier for it to make mistake; Thus, in the actual application, adopting TCP spoofing technology to pretend as the ground end for packet sending guarantees the timely feedback of the date.

As shown in FIG. 4, the server and the client end use Linux system; Both two Linux system devices with dual network interface card adopt the control method of this invention and are condiagramd to the independent gateways to offer protocol conversion and network acceleration function. The Wide Area Network Emulator(WANem) is used to simulate the satellite network.

The performance comparison diagram of adopting this invention and adopting the traditional SCPS-TP transmission method is given in FIG. 5; FIG. 5 shows the performance comparison diagram of adopting this invention and adopting the traditional SCPS-TP transmission method when the bottleneck bandwidth is 100 Mbps and the round trip time is 400 ms with different bit error rates, from which we can see that the performance of this invention obviously improves with different bit error rates.

Figure 6:
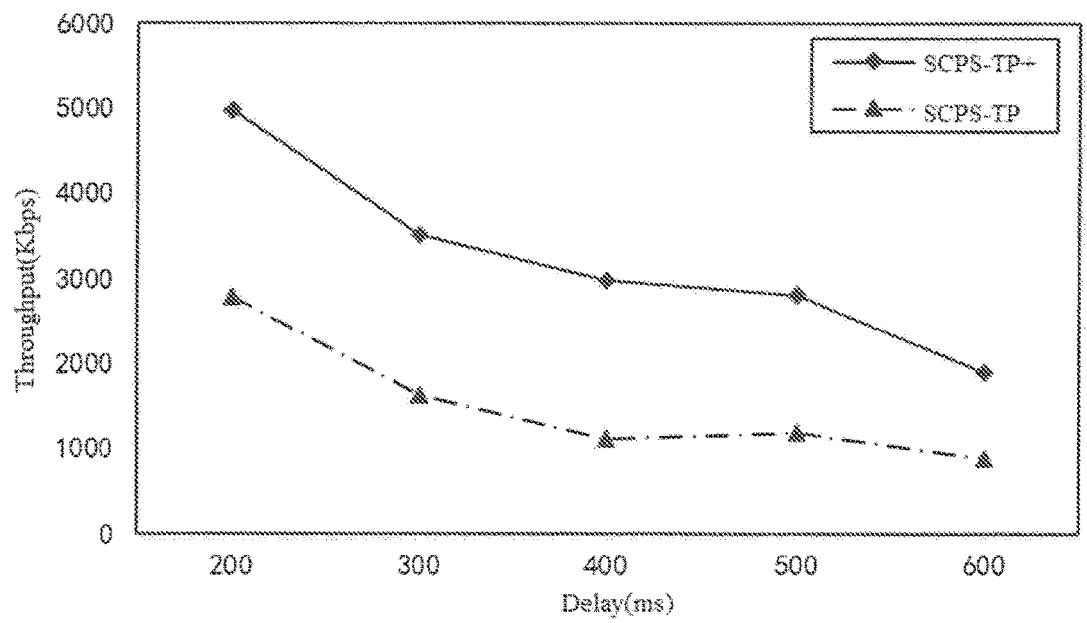
FIG. 6 shows the performance comparison diagram of adopting the control method of this invention and the transmission control method of other protocols when the bottleneck bandwidth is 100 Mbps and the link bit error rate is $10^{-6}$ with different round trip time.

The performance comparison diagram with bottleneck bandwidth as 100 Mbps, link bit error rate as $10^{-6}$ and different round trip time is given in FIG. 6, from which we can see that with different round trip time, the transmission performance of the control method of this invention improves obviously being compared with the traditional SCPS-TP transmission method, which is more suitable for the satellite network communication.

What is mentioned above is just the better implementation case of this invention, which is not used for limiting this invention. All modifications, equal replacement and improvements, etc. within the spirit and principle of this invention shall be included in the protection range of this invention.

The invention claimed is:

1. A self-adaptive network congestion control method based on space communications protocol specification-transport protocol (SCPS-TP) for a network, the method comprising:
    a Step A in which
        a source-end gateway receives acknowledgments (ACKs) and packets from a ground end, repackages the packets and sends the ACKs and the packets to a destination end gateway, and,
        in response to the destination end gateway of receiving the ACKs and the packets from the source-end gateway, the destination end gateway analyzes, stores and transmits the packets to a ground destination end;
    a Step B in which, in response to information in the ACKs and the packets analyzed in the Step A having a selective negative acknowledgment (SNACK) option, the information is recorded in a linked list of a packet-loss buffer;
    a Step C in which
        it is judged whether a new packet is received based on the ACK and the packet analyzed in the Step A,
        in response to the new packet being received, the corresponding information is updated,
        in response to no new packet being received, a duplicate ACK counter is increased, and
        in response to the duplicate ACK counter increasing to a certain value, the size of a network congestion window is reduced and a growth mode of the congestion window is changed from an exponential growth mode to a linear self-adaptive mode;
    a Step D in which, in response to the new packet being received in the Step C, an estimated value sample of the network bandwidth is measured, smoothing on the sample is conducted, and the difference (Diff) between expected network throughput and actual network throughput is calculated;
    a Step E in which,
        in response to the growth mode of the congestion window being the exponential growth mode and the Diff in the Step D being greater than a set value after the congestion window is enlarged, the growth mode is changed to the linear self-adaptive mode, and
        in response to the growth mode being the linear self-adaptive mode the congestion window size is adjusted in accordance with the Diff calculated in the Step D; and
    a Step F in which the source-end gateway sends out the packets of the packet-loss buffer of the Step B and sends out new packets in accordance with the adjusted size of the congestion window, wherein
    a control method of the congestion window under the linear self-adaptive mode is as follows:

$$W_t = \begin{cases} \max(W_{t-1} + MAXSEG, \overline{BW_t} \times SRTT) & Diff_t \leq Alpha_{t-1} \\ W_{t-1} & Alpha_{t-1} < Diff_t < Beta_{t-1} \\ W_{t-1} - MAXSEG & Diff_t \geq Beta_{t-1} \end{cases}$$

wherein $W_t$ is the size of the congestion window at Moment t, MAXSEG (maximum segment) is the maximum segment length, SRTT (smoothed round-trip time) is the RTT (round-trip time) value after smoothing, $Alpha_t$ is the alpha value of the Moment t, $Beta_t$ is the beta value of the Moment t, and $\overline{BW_t}$ is the bandwidth evaluation value of the Moment t after smoothing.

2. The self-adaptive network congestion control method according to claim 1, wherein self-adaptive adjustment is conducted on the damping threshold values $Alpha_t$ and $Beta_t$ in accordance with the current throughput and the throughput of the last moment, and an average method is adopted to move the threshold range around the Diff, the average method being as follows:

$$X_t = \frac{|Alpha_{t-1} - Diff_t|}{2}$$

$$Y_t = \frac{|Beta_{t-1} - Diff_t|}{2}$$

$(Alpha_t, Beta_t) =$ $$\begin{cases} (Alpha_{t-1} - X_t, Beta_{t-1} - X_t) & Actual_t < Actual_{t-1} \text{ AND } Diff_t < Alpha_{t-1} \\ (Alpha_{t-1} - Y_t, Beta_{t-1} - Y_t) & Actual_t < Actual_{t-1} \text{ AND } Diff_t > Beta_{t-1} \\ (Alpha_{t-1} + X_t, Beta_{t-1} + X_t) & Actual_t > Actual_{t-1} \text{ AND } Diff_t < Alpha_{t-1} \\ (Alpha_{t-1} + Y_t, Beta_{t-1} + Y_t) & Actual_t > Actual_{t-1} \text{ AND } Diff_t > Beta_{t-1} \\ (Alpha_{t-1}, Beta_{t-1}) & \text{OTHERS} \end{cases}$$

wherein $X_t$ and $Y_t$ are adjustment factors of the damping threshold values $Alpha_t$ and $Beta_t$ of the Moment t.

3. The self-adaptive network congestion control method according to claim 1, wherein the calculation method of the Diff at Moment t in the Step D is as follows:

$$Diff_t = Expected_t - Actual_t = \frac{Window\ Size}{BaseRTT_t} - \frac{Byte_t}{Sample\ RTT_t}$$

wherein $Expected_t$ is the throughput which is expected at the Moment t, $Actual_t$ is the throughput which is measured actually at the Moment t, $BaseRTT_t$ is the minimum round trip time which is recorded at the Moment t, $Window\ Size_t$ is the number of bytes in the network at the Moment t, $Byte_t$ is the data sent from sending to receiving a feedback of every packet recorded by the sender at the Moment t, and $Sample\ RTT_t$ is the actual RTT of this packet at the Moment t.

4. The self-adaptive network congestion control method according to claim 1, wherein the smoothing method in the Step D includes:

adopting an exponential weighting average filter (EWMA) with a vertical horizontal filter (VHF) to conduct the smoothing and calculating a weighting factor of the EWMA in accordance with a dispersion degree of the measured bandwidth evaluation value sample and conducting smoothing as per the following formula:

$$a_t = b \times \frac{\Delta max_t}{\sum_{k=t-M}^{t} |OBW_k - OBW_{k-1}|}$$

$$\overline{BW_t} = (1 - a_t) \times OBW_t + a_t \overline{BW_{t-1}}$$

wherein $a_t$ is the EWMA weighting factor of Moment t, b is the constant factor of the VHF, and $\Delta max_t$ is the difference between the maximum and the minimum of the newest M measured bandwidth evaluation value samples of the Moment t, M is the size of the VHF sample window, $OBW_t$ is the bandwidth evaluation value sample measured at the Moment t, and $\overline{BW_t}$ is the bandwidth evaluation value at the Moment t after smoothing of the EWMA with the VHF.

5. The self-adaptive network congestion control method according to claim 1, wherein the source-end gateway in the Step A uses TCP spoofing technology to act as the ground end after repackaging the packets and sends the packets to the destination end.

\* \* \* \* \*